United States Patent
Savatsky et al.

(10) Patent No.: US 10,167,351 B2
(45) Date of Patent: Jan. 1, 2019

(54) METHODS OF CONTROLLING POLYOLEFIN MELT INDEX WHILE INCREASING CATALYST PRODUCTIVITY

(71) Applicant: Univation Technologies, LLC, Houston, TX (US)

(72) Inventors: Bruce J. Savatsky, Kingwood, TX (US); Natarajan Muruganandam, Hillsborough, NJ (US); Timothy R. Lynn, Middlesex, NJ (US); James M. Farley, League City, TX (US); Daniel P. Zilker, Jr., Easton, PA (US); Fathi David Hussein, Hilton Head Island, SC (US)

(73) Assignee: Univation Technologies, LLC, Houston, TX (US)

(*) Notice: Subject to any disclaimer, the term of this patent is extended or adjusted under 35 U.S.C. 154(b) by 44 days.

(21) Appl. No.: 15/527,023

(22) PCT Filed: Nov. 24, 2015

(86) PCT No.: PCT/US2015/062256
§ 371 (c)(1),
(2) Date: May 16, 2017

(87) PCT Pub. No.: WO2016/085896
PCT Pub. Date: Jun. 2, 2016

(65) Prior Publication Data
US 2017/0362353 A1    Dec. 21, 2017

Related U.S. Application Data

(60) Provisional application No. 62/084,228, filed on Nov. 25, 2014.

(51) Int. Cl.
*B01J 8/18* (2006.01)
*C08F 2/34* (2006.01)
(Continued)

(52) U.S. Cl.
CPC .............. *C08F 10/02* (2013.01); *B01J 8/1809* (2013.01); *B01J 8/1818* (2013.01); *B01J 8/1827* (2013.01);
(Continued)

(58) Field of Classification Search
CPC ........ B01L 8/1818; B01L 8/1827; C08F 2/34; C08F 110/02; C08F 4/6592
See application file for complete search history.

(56) References Cited

U.S. PATENT DOCUMENTS

2005/0282980 A1   12/2005   Szul et al.
2015/0210782 A1   7/2015    Hari et al.
(Continued)

OTHER PUBLICATIONS

International Search Report and Written Opinion for related PCT Application PCT/US2015/062256, dated Mar. 7, 2016 (12 pgs).
(Continued)

*Primary Examiner* — Caixia Lu
(74) *Attorney, Agent, or Firm* — Brooks, Cameron & Huebsch, PLLC

(57) ABSTRACT

The catalyst productivity of a polyolefin catalyst in the methods disclosed herein may be increased by increasing the concentration of an induced condensing agent (ICA) in the reactor system. The effect the increased ICA concentration may have on a melt index may be counteracted, if necessary, in various ways.

19 Claims, 6 Drawing Sheets

(51) Int. Cl.
*C08F 110/02* (2006.01)
*C08F 10/02* (2006.01)

(52) U.S. Cl.
CPC ............... *B01J 8/1836* (2013.01); *C08F 2/34* (2013.01); *B01J 2208/00061* (2013.01); *B01J 2208/00274* (2013.01); *B01J 2208/00539* (2013.01); *B01J 2208/00548* (2013.01); *B01J 2208/00557* (2013.01); *B01J 2208/00628* (2013.01); *B01J 2208/00663* (2013.01); *B01J 2208/00991* (2013.01); *C08F 110/02* (2013.01); *C08F 2400/02* (2013.01)

(56) References Cited

U.S. PATENT DOCUMENTS

| | | | |
|---|---|---|---|
| 2017/0259236 A1* | 9/2017 | Savatsky | B01J 8/1809 |
| 2017/0355790 A1* | 12/2017 | Savatsky | B01J 8/1809 |
| 2017/0355791 A1* | 12/2017 | Savatsky | B01J 8/1827 |

OTHER PUBLICATIONS

International Preliminary Report on Patentability for related PCT Application PCT/US2015/062256, dated Jun. 8, 2017 (9 pgs).

* cited by examiner

METHODS OF CONTROLLING POLYOLEFIN MELT INDEX WHILE INCREASING CATALYST PRODUCTIVITY

This application is a National Stage Application under 35 U.S.C. § 371 of International Application Number PCT/US2015/062256, filed Nov. 24, 2015 and published as WO 2016/085896 on Jun. 2, 2016, which claims the benefit to U.S. Provisional Application 62/084,228, filed Nov. 25, 2014, the entire contents of which are incorporated herein by reference in its entirety.

BACKGROUND

The exemplary embodiments described herein relate to methods for producing polyolefin polymers.

Polyolefin polymers may be produced using gas phase polymerization processes. In a typical gas-phase fluidized bed polymerization process, a gaseous stream containing one or more monomers is continuously passed through the fluidized bed under reactive conditions in the presence of a catalyst. The gaseous stream is withdrawn from the fluidized bed and recycled back into the reactor. Generally, the recycled gas stream is heated in the reactor by the heat of polymerization. This heat may be removed in another part of the cycle (e.g., by a cooling system external to the reactor such as a heat exchanger), so as to maintain the temperature of the resin and gaseous stream inside the reactor below the polymer melting point or the catalyst deactivation temperature.

Heat removal may also help prevent excessive stickiness of polymer particles that may result in agglomeration. Particle agglomerations may lead to the formation of chunks or sheets of polymer that cannot be removed from the reactor as product. Further, such chunks or sheets may fall onto the reactor distributor plate which may impair fluidization of the bed and may lead to a discontinuity event. Additionally, since the polymerization reaction is exothermic, the amount of polymer produced in a fluidized bed polymerization process is related to the amount of heat that can be withdrawn from the reaction zone.

For a time, it was thought that the temperature of the gaseous stream external to the reactor, otherwise known as the recycle stream temperature, could not be decreased below the dew point of the recycle stream without causing problems such as polymer agglomeration or plugging of the reactor system. The dew point of the recycle stream is the temperature at which liquid condensate first begins to form in the gaseous recycle stream, which can be calculated knowing the gas composition and is thermodynamically defined using an equation of state. However, it was found that in some instances a recycle stream may be cooled to a temperature below the dew point in a fluidized bed polymerization process resulting in condensing a portion of the recycle gas stream outside of the reactor. The resulting stream containing entrained liquid can then be returned to the reactor without causing agglomeration or plugging phenomena. The process of purposefully condensing a portion of the recycle stream is known in the industry as "condensed mode" operation. When a recycle stream temperature is lowered to a point below its dew point in condensed mode operation, an increase in polymer production may be possible.

Cooling of the recycle stream to a temperature below the gas dew point temperature produces a two-phase gas/liquid mixture that may have entrained solids contained in both phases. The liquid phase of this two-phase gas/liquid mixture in condensed mode operation is generally entrained in the gas phase of the mixture. Vaporization of the liquid occurs only when heat is added or pressure is reduced. Generally, the vaporization occurs when the two-phase mixture enters the fluidized bed, with the resin providing the required heat of vaporization. The vaporization thus provides an additional means of extracting heat of reaction from the fluidized bed.

The cooling capacity of the recycle gas may be increased further while at a given reaction temperature and a given temperature of the cooling heat transfer medium. This can be performed by adding non-polymerizing, non-reactive materials to the reactor, which are condensable at the temperatures encountered in the process heat exchanger. Such materials are collectively known as induced condensing agents (ICA). Increasing concentrations of an ICA in the reactor cause corresponding increases in the dew point temperature of the reactor gas, which promotes higher levels of condensing for higher (heat transfer limited) production rates from the reactor. However, increasing the ICA concentration in the reactor changes the melt index of the produced polyolefin, which is often undesirable because the melt index of the polyolefin is one of the crucial polymer properties to customers that later produce articles like disposable bags and medical devices therefrom. Even small deviations in melt index outside a specified range can affect the processability of the polyolefin when producing downstream articles.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1A:
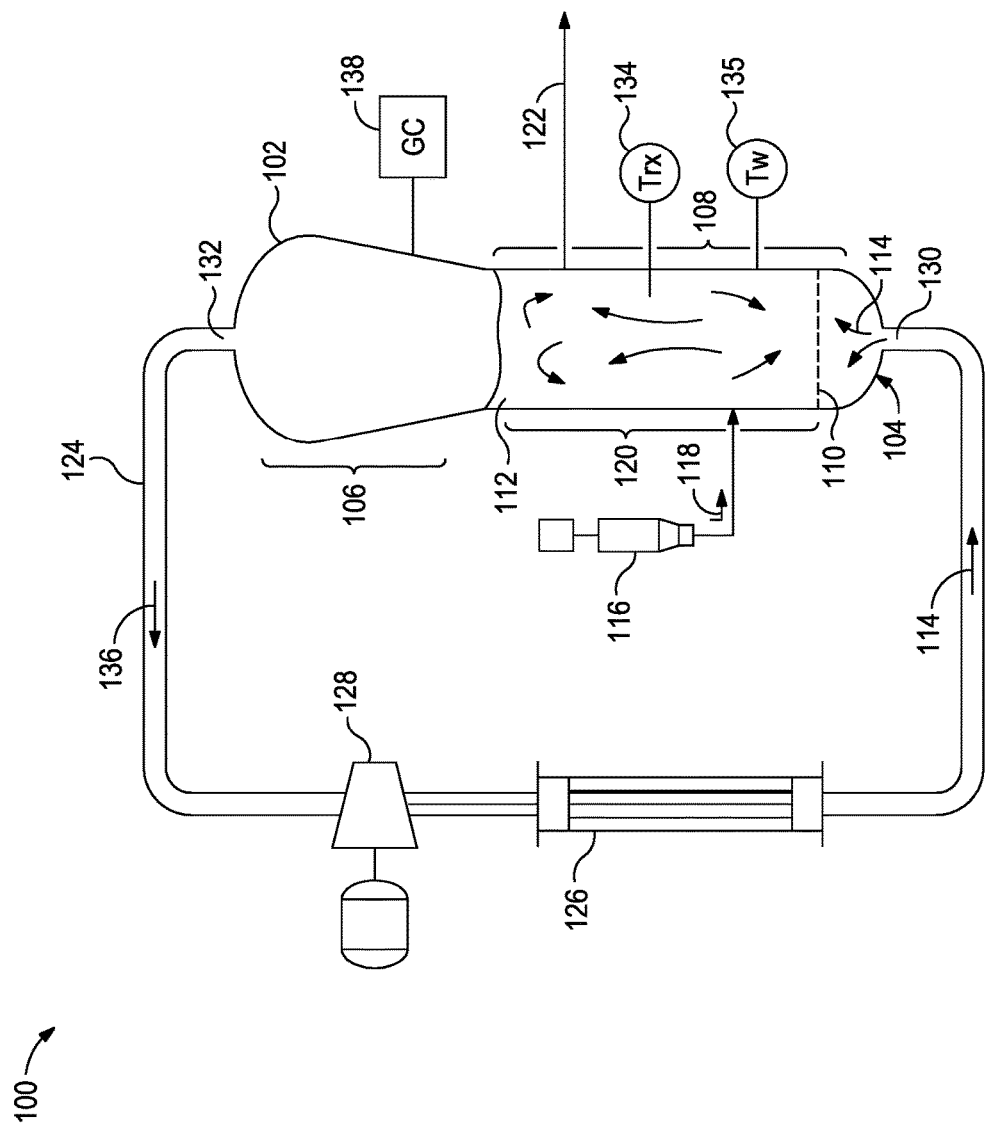
FIG. 1A is a schematic diagram of a polymerization system that can be monitored and controlled in accordance with some of the embodiments described herein.

The exemplary embodiments described herein relate to methods for producing polyolefin polymers. More specifically, the present disclosure relates to methods for increasing polyolefin catalyst productivities while controlling the melt index, as desired, of the produced polyolefin.

It has been determined that increasing ICA concentration in the reactor system can increase the catalyst productivity. Generally, increasing the ICA concentration decreases the melt index of the polyolefin. The methods described herein, however, allow for controlling the melt index of the polyolefin as desired while still increasing the ICA concentration and thus taking advantage of the effect of increased catalyst productivity.

A method is disclosed herein comprising contacting in a fluidized bed gas phase reactor an olefin monomer with a catalyst system in the presence of an ICA to produce a first polyolefin having a first melt index, the catalyst system comprising a metallocene catalyst, and increasing a partial pressure of the ICA in the reactor to produce a second polyolefin having a second melt index, wherein increasing the partial pressure of the ICA results in a higher catalyst productivity for producing the second polyolefin when compared to the catalyst productivity for producing the first polyolefin.

The catalyst productivity for producing the second polyolefin may be at least 5%, at least 10%, at least 15%, or at least 20% higher than the catalyst productivity for producing the first polyolefin.

The second melt index may be within 10% of the first melt index. The second melt index may also be more than 10% different from the first melt index. When desired according to the product specification for the polyolefin being produced, a partial pressure of hydrogen, olefin monomer, or comonomer, or any combination of these, within the reactor may be adjusted to bring or maintain the second melt index to within 10% of the first melt index. For example, a partial pressure of olefin monomer or hydrogen, or both, in the reactor may be increased to bring or maintain the second melt index to within 10% of the first melt index. A partial pressure of comonomer in the reactor may be decreased to bring or maintain the second melt index to within 10% of the first melt index. Any combination of partial pressure or concentration of hydrogen, olefin monomer, and comonomer may be adjusted in any manner as necessary to achieve the desired polyolefin melt index.

As used herein, the term "ICA" refers to the total ICA in the reactor and encompasses compositions with one or more ICA components. As used herein, the term "ICA component" refers to individual components of an ICA. For example, an ICA may include isopentane, n-butane, or a combination thereof. Exemplary ICA components suitable for use in the methods described herein may include, but are not limited to, n-butane, isobutane, n-pentane, isopentane, hexane, isohexane, and other hydrocarbon compounds that are similarly non-reactive in the polymerization process.

With reference to a product being produced by a continuous reaction, the expression "instantaneous" value of a property of the product herein denotes the value of the property of the most recently produced quantity of the product. The most recently produced quantity typically undergoes mixing with previously produced quantities of the product before a mixture of the recently and previously produced product exits the reactor. In contrast, with reference to a product being produced by a continuous reaction, "average" (or "bed average") value (at a time "T") of a property herein denotes the value of the property of the product that exits the reactor at time T.

As used herein, the term "polyethylene" denotes a polymer of ethylene and optionally one or more $C_3$-$C_{18}$ alpha-olefins, while the term "polyolefin" denotes a polymer of one or more $C_2$-$C_{18}$ alpha-olefins.

As used herein, the term "melt index" refers to a measure of the use of flow of the melt of the thermoplastic polymer. Melt index may be measured according to ASTM D1238-13 at any suitable weight and temperature. Generally, the melt index of polyolefins is measured at 2.16 kg at 190° C., 5 kg at 190° C., or 21.6 kg at 190° C.

Reactor

The methods described herein may be used in any number of pilot plant or commercial size reactors including any number of designs. For example, the model can be used in commercial-scale reactions, such as gas-phase fluidized-bed polymerization reactions, that can be monitored and optionally also controlled in accordance with the invention. Some such reactions can occur in a reactor having the geometry of the fluidized bed reactor 102 discussed with respect to FIG. 1A. In other embodiments, a reactor is monitored and optionally also controlled in accordance with the invention while it operates to perform polymerization using any of a variety of different processes (e.g., slurry, or gas phase processes).

FIG. 1A is a schematic diagram of a polymerization system 100 that can be monitored and controlled in accordance with embodiments described herein. The polymerization system 100 includes a fluidized bed reactor 102. The fluidized bed reactor 102 has a bottom end 104, a top expanded section 106, a straight section 108, and a distributor plate 110 within the straight section 108. A fluidized bed 112 of granular polymer and catalyst particles is contained within the straight section 108, and may optionally extend slightly into the top expanded section 106. The bed is fluidized by the steady flow of recycle gas 114 through the distributor plate 110. The flow rate of the recycle gas 114 is regulated to circulate the fluidized bed 112, as illustrated in FIG. 1A. In some implementations, a superficial gas velocity of about 1 ft/sec to about 3 ft/sec is used to maintain a fluidized bed 112 in the reactor 102 while operating the reactor 102 at a total pressure of about 300 psi.

The polymerization system 100 has one or more catalyst feeders 116 for controlling the addition of polymerization catalyst 118 to a reaction zone 120 within the fluidized bed 112. Within the reaction zone 120, the catalyst particles react with a primary monomer (e.g., ethylene) and optionally a comonomer and other reaction gases (e.g., hydrogen) to produce the granular polymer particles. As new polymer particles are produced, other polymer particles are continually withdrawn from the fluidized bed 112 through a product discharge system 122. The fluidized bed 112 may be maintained at a constant height by withdrawing a portion of the fluidized bed 112 at a rate equal to the rate of formation of particulate product. The product may be removed continuously or nearly continuously via a series of valves (not shown) into a fixed volume chamber (not shown), which is simultaneously vented back to the reactor. This allows for highly efficient removal of the product, while recycling a large portion of the unreacted gases back to the reactor.

After passing through the product discharge system 122, the polymer granules may be degassed (or "purged") with a flow of inert gas such as nitrogen to remove substantially all of the dissolved hydrocarbon materials. In some instances, the polymer granules may be treated with a small stream of humidified nitrogen to deactivate any trace quantities of residual catalyst.

The polymerization system 100 also has a cooling loop which includes a recycle gas line 124, a cooler 126 (such as a circulating gas cooler), and a compressor 128, coupled with the fluidized bed reactor 102. During operation, the cooled circulating gas from the cooler 126 flows through inlet 130 into the fluidized bed reactor 102, then propagates upward through the fluidized bed 112 and out from the fluidized bed reactor 102 via outlet 132.

The top expanded section 106 is also known as a "velocity reduction zone," and is designed to minimize the quantities of particle entrainment from the fluidized bed. The diameter of the top expanded section 106 generally increases with the distance from straight section 108. The increased diameter causes a reduction in the speed of the recycle gas 114, which allows most of the entrained particles to settle back into the fluidized bed 112, thereby minimizing the quantities of solid particles that are "carried over" from the fluidized bed 112 through the recycle gas line 124. Finer entrained particles and dust may optionally be removed in a cyclone and/or fines filter (not shown). In some instances, a screen (not shown) may be included upstream of the compressor 128 to remove larger material.

To maintain a reactor temperature, the temperature of the recycle gas 114 may be continuously adjusted up or down to accommodate any changes in the rate of heat generation due to the polymerization. One or more temperature sensors 134 may be located in the fluidized bed, and used with a control system and the cooling loop to control the temperature T, of the fluidized bed 112 near the process set-point. Heated reactor gas 136, which carries heat energy from the fluidized bed reactor 102, is withdrawn from the outlet 132 and is pumped by the compressor 128 to the cooler 126 wherein the temperature of the heated reactor gases 136 is reduced and at least some of the ICA present are condensed to a liquid. The recycle gas 114 from the cooler 126, including any condensed liquids, flows to the reactor inlet 130 to cool the fluidized bed 112. Temperature sensors (not shown) near the inlet and outlet of the cooler 126 may provide feedback to a control system (FIG. 1B) to regulate the amount by which cooler 126 reduces the temperature of the recycle gas 114 entering the fluidized bed reactor 102.

The fluidized bed reactor 102 may also include skin temperature sensors 135, mounted in positions along a wall of the straight section 108 of the fluidized bed reactor 102 so as to protrude into the bed from the reactor wall by a small amount (e.g., about one eighth to one quarter of an inch). The skin temperature sensors 135 may be configured and positioned to sense the temperature $T_w$ of the resin near the wall of the fluidized bed reactor 102 during operation.

The temperature sensors 134 in the fluidized bed 112 can include a resistance temperature sensor positioned and configured to sense bed temperature during reactor operation at a location within the fluidized bed reactor 102 away from the reactor wall. The resistance temperature sensor can be mounted so as to protrude into the bed more deeply than the skin temperature sensors 135 (e.g., about 8 to 18 inches away from the reactor wall).

Other sensors and other apparatuses may be employed to measure other reaction parameters during a polymerization reaction. The reaction parameters may include instantaneous and bed-averaged resin product properties (e.g., melt index and density of the polymer resin product being produced by the polymerization system 100 during a polymerization reaction). Resin product properties are conventionally measured by periodically sampling the resin as it exits the reactor (e.g., about once per hour), and performing the appropriate tests in a quality control laboratory.

Other measured reaction parameters may include reactor gas composition (e.g., concentrations and partial pressures of reactant gases, ICA, inert gases, and isomers of other materials, such as nitrogen, inert hydrocarbon, and the like). The reactor gas composition may be measured with a gas chromatograph system 138.

The process control variables may be controlled to obtain the desired catalyst productivity for the polymerization system 100 and properties for the resin. For example, the parameters used to control gas phase composition within the fluidized bed reactor 102 can include the concentration and composition of the ICA and comonomer, the partial pressure of monomer, and the type and properties of catalysts, and the temperature of the reaction process. For example, it is known that a polymerization reaction during a transition may be controlled by controlling process control variables to ensure that the product (e.g., the granular resin) has properties compliant with an initial specification set at the start of the transition, the product produced during the transition ceases to comply with the initial specification set at a first time, and the product has properties compliant with a final specification set at the end of the transition.

Figure 1B:
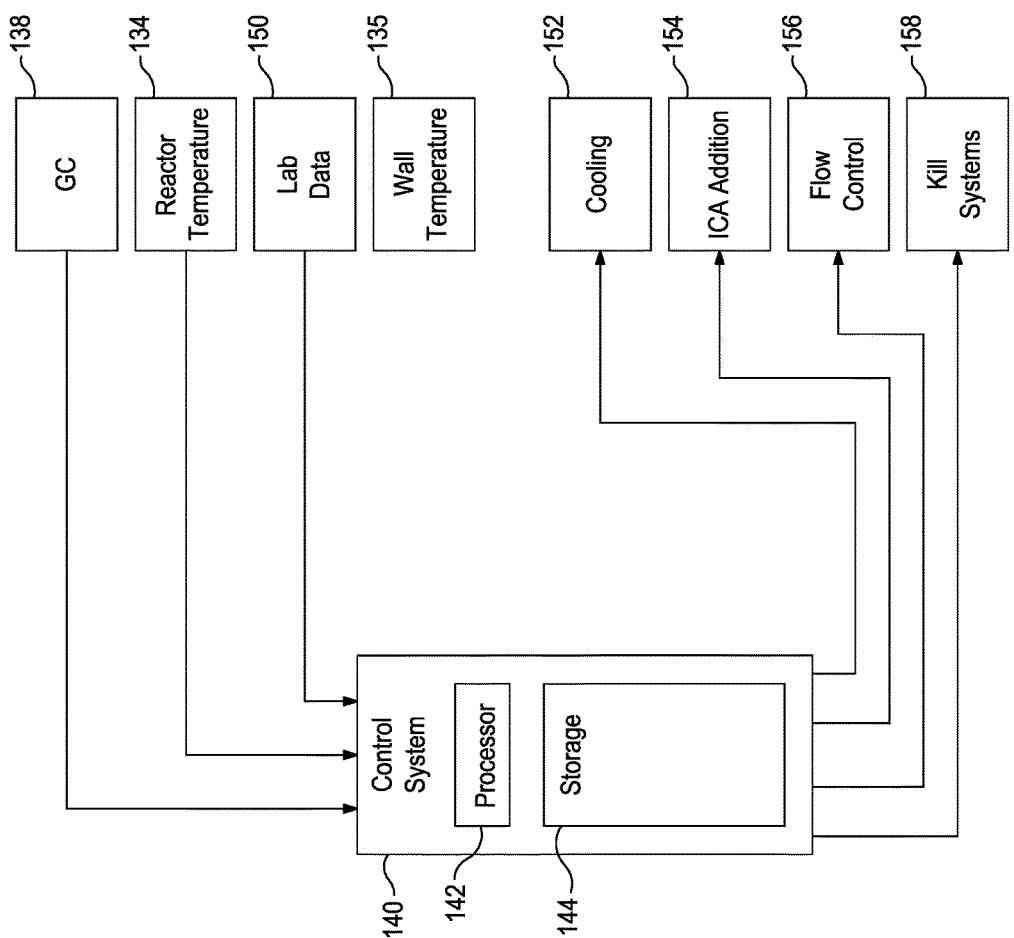
FIG. 1B is a block diagram of a control system that can be used to control the polymerization system in accordance with some of the embodiments described herein.

FIG. 1B is a block diagram of a control system 140 that can be used to control the polymerization system 100. The control system 140 may be a distributed control system (DCS), a direct digital controller (DDC), a programmable logic controller (PLC), or any other suitable system or combination of systems. The control system 140 has a processor 142 that implements machine readable instructions from a storage system 144. Illustrative processors may include a single core processor, a multiple core processor, a virtual processor, a virtual processor in a cloud implementation, an application specific integrated circuit (ASIC), or any combination of these systems. Illustrative storage systems 144 can include random access memory (RAM), read only memory (ROM), hard drives, virtual hard drives, RAM drives, cloud storage systems, optical storage systems, physically encoded instructions (for example, in an ASIC), or any combination of these systems.

Adjustments to control settings may be determined based on the output of temperature sensors 134 and 135, the gas chromatograph system 138, and lab data 150, among others. After determining new control settings, the control system 140 may make, or recommend, adjustments, for example, to the process cooling systems 152, the ICA addition and recycling systems 154, flow control systems 156, and kill systems 158, among others.

One skilled in the art would readily recognize that the reactor and associated methods may be an element of a staged reactor employing two or more reactors in series, wherein one reactor may produce, for example, a high molecular weight polyolefin and another reactor may produce a low molecular weight polyolefin.

Polyolefin Production Methods

Polyolefin polymerization may be performed by contacting in a reactor (e.g., fluidized bed reactor 102 of FIG. 1A) an olefin monomer and optionally a comonomer with a catalyst system in the presence of ICA and optionally hydrogen. The individual flow rates of olefin monomer, optional comonomer, optional hydrogen, and ICA (or components thereof) may be controlled to maintain fixed gas composition targets. The concentration of all gases may be measured with a chromatograph. A solid catalyst, a catalyst slurry, or liquid solution of the catalyst may, for example, be injected directly into the reactor using, for example, a carrier fluid (e.g., purified nitrogen) or a mixture of a carrier fluid and ICA, where the feed rate of catalyst may be adjusted to change or maintain the catalyst inventory in the reactor.

The methods described herein utilize increased ICA concentrations in the reactor to enhance catalyst productivity. The polyolefin melt index may be maintained or substantially maintained (e.g., within about 10%, within about 5%, or within about 2% or less; or within about 3 dg/min, within about 2 dg/min, within about 1 dg/min or less, depending on targets) by adjusting the relative concentration of hydrogen, olefin monomer, or comonomer, or any combination of these, in the reactor (i.e., the mol % of the total reactor gas that is hydrogen, olefin monomer, or comonomer which may be derived from the partial pressure relative to the total pressure in the reactor). The implementation and effect of adjusting the hydrogen, olefin monomer, or comonomer concentration may depend on the specific catalyst system used.

In some instances, the catalyst system may comprise a metallocene catalyst (detailed further herein). In some embodiments when using a metallocene catalyst, decreasing the relative concentration of olefin monomer in the reactor may be achieved by increasing the partial pressure of hydrogen ($H2_{PP}$) in the reactor, which increases the ratio of the hydrogen mol % of total reactor gas to the olefin monomer mol % of total reactor gas ($H2_{mol}$:monomer$_{mol}$). In some embodiments when using a metallocene catalyst, decreasing the relative concentration of olefin monomer in the reactor may also be achieved by decreasing the partial pressure of olefin monomer (monomer$_{PP}$) in the reactor. In some instances where a comonomer is also utilized, the ratio of the olefin monomer mol % of total reactor gas to the comonomer mol % of total reactor gas (monomer$_{mol}$:comonomer$_{mol}$) may be maintained or substantially maintained so as to produce the desired polyolefin. Any combination of these features may also be used.

Interestingly, it has been observed that increasing the $H2_{PP}$ can also increase the catalyst productivity. Accordingly, increasing both $ICA_{PP}$ and $H2_{PP}$ may synergistically enhance polyolefin catalyst productivity while maintaining the desired polyolefin melt index.

In some instances, the ICA concentration in the reactor may be about 1 mol % of total reactor gas or greater, about 1 mol % to about 30 mol % of total reactor gas, about 3 mol % to about 30 mol % of total reactor gas, about 6 mol % to about 30 mol % of total reactor gas, about 8 mol % to about 30 mol % of total reactor gas, or about 10 mol % to about 30 mol % of total reactor gas.

In some embodiments, the olefin partial pressure may be at up to about 600 psi (4138 kPa), about 100 psi (690 kPa) to about 600 psi (4138 kPa), about 200 psi (1379 kPa) to about 400 psi (2759 kPa), or about 150 psi (1724 kPa) to about 250 psi (2414 kPa).

When present, the comonomer may be at any relative concentration to the olefin monomer that will achieve the desired weight percent incorporation of the comonomer into the finished polyolefin. In some embodiments, the comonomer may be present with the olefin monomer in a mole ratio range in the gas phase of from about 0.0001 to about 50 (comonomer to olefin monomer), from about 0.0001 to about 5 in another embodiment, from about 0.0005 to about 1.0 in yet another embodiment, and from about 0.001 to about 0.5 in yet another embodiment.

The olefin monomer or comonomers, for example, may contain from 2 to 18 carbon atoms in some embodiments. In another embodiment, the olefin monomer may be ethylene, and a comonomer may comprise from 3 to 12 carbon atoms. In yet another embodiment, the olefin monomer may be ethylene or propylene, and a comonomer may comprise from 4 to 10 carbon atoms. In another embodiment, the olefin monomer may be ethylene or propylene, and a comonomer may comprise from 4 to 8 carbon atoms. Exemplary alpha-olefins that may be utilized as a comonomer in embodiments described herein may include, but are not limited to, ethylene, propylene, 1-butene, 1-pentene, 1-hexene, 1-heptene, 1-octene, 4-methylpent-1-ene, 1-decene, 1-dodecene, 1-hexadecene, and the like, and any combination thereof. Additionally, a polyene may be used as a comonomer according to some embodiments described herein. Exemplary polyenes may include, but are not limited to, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, and olefins formed in situ in the polymerization medium. When olefins are formed in situ in the polymerization medium, the formation of polyolefins containing long chain branching may occur. Additional examples of comonomers may include isoprene, styrene, butadiene, isobutylene, chloroprene, acrylonitrile, and cyclic olefins. Combinations of the foregoing may be utilized in the methods described herein.

Examples of polymers that can be produced in accordance with the method described herein may include the following: homopolymers and copolymers of $C_2$-$C_{18}$ alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; polychloroprene; norbornene homopolymers and copolymers with one or more $C_2$-$C_{18}$ alpha olefins; and terpolymers of one or more $C_2$-$C_{18}$ alpha olefins with a diene. In some embodiments, the polyolefin produced by the method described herein may include olefin homopolymers (e.g., homopolymers of ethylene or propylene). In some instances, the polyolefin produced may be copolymers, terpolymers, and the like of the olefin monomer and the comonomer. In some embodiments, the polyolefin produced may be a polyethylene or a polypropylene. Exemplary polyethylenes produced by the methods described herein may be homopolymers of ethylene or interpolymers of ethylene and at least one alpha-olefin (comonomer) wherein the ethylene content may be at least about 50% by weight of the total monomers involved. Exemplary polypropylenes produced by the methods described herein may be homopolymers of propylene or interpolymers of propylene and at least one alpha-olefin (comonomer) wherein the propylene content may be at least about 50% by weight of the total monomers involved.

The amount of hydrogen used in some polymerization processes is an amount necessary to achieve the desired melt index (or molecular weight) of the final polyolefin resin. In some embodiments, the $H2_{mol}$:monomer$_{mol}$ may be greater than about 0.00001, greater than about 0.0005, greater than about 0.001, less than about 10, less than about 5, less than about 3, or less than about 0.10, wherein a desirable range may comprise any combination of any upper mole ratio limit with any lower mole ratio limit described herein. Expressed another way, the amount of hydrogen in the reactor at any time may range to up to about 10 ppm in some embodiments, up to about 100 or about 3000 or about 4000 or about 5000 ppm in other embodiments, between about 10 ppm and about 5000 ppm in yet another embodiment, or between about 500 ppm and about 2000 ppm in another embodiment.

Catalyst

Exemplary catalysts suitable for use in the embodiments described herein may include, but are not limited to, Ziegler Natta catalysts, chromium based catalysts, vanadium based catalysts (e.g., vanadium oxychloride and vanadium acetylacetonate), metallocene catalysts and other single-site or single-site-like catalysts, cationic forms of metal halides (e.g., aluminum trihalides), anionic initiators (e.g., butyl lithiums), cobalt catalysts and mixtures thereof, Nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium. A single catalyst may be used, or a mixture of catalysts may be employed, if desired. The catalyst may be soluble or insoluble, supported or unsupported. Further, the catalyst may be a prepolymer, spray dried with or without a filler, a liquid, or a solution, slurry/suspension, or dispersion.

The metallocene catalyst compounds useful in embodiments herein may include "half sandwich" and "full sandwich" compounds having one or more "Cp" ligands (cyclopentadienyl and ligands isolobal to cyclopentadienyl) bound to at least one Group 3 to Group 12 metal atom, and one or more leaving groups bound to the at least one metal atom. The metallocene catalyst component may be supported on a support material, as described further below, and may be supported with or without another catalyst component. Useful metallocenes may include those described in U.S. Pat. Nos. 8,084,560 and 7,579,415.

The Cp ligands are one or more rings or ring system(s), at least a portion of which includes pi-bonded systems, such as cycloalkadienyl ligands and heterocyclic analogues. The ring(s) or ring system(s) typically comprise atoms selected from Groups 13 to 16 atoms, and, in particular exemplary embodiments, the atoms that make up the Cp ligands are selected from carbon, nitrogen, oxygen, silicon, sulfur, phosphorous, germanium, boron and aluminum and combinations thereof, wherein carbon makes up at least 50% of the ring members. For example, the Cp ligand(s) may be selected from substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$Ind"), substituted versions thereof (as described in more detail below), and heterocyclic versions thereof.

The metal atom "M" of the metallocene catalyst compound may be selected from Groups 3 through 12 atoms and lanthanide Group atoms. For example, the metal atom "M" may be selected from Groups 3 through 10 atoms; or may be selected from Sc, Ti, Zr, Hf, V, Nb, Ta, Mn, Re, Fe, Ru, Os, Co, Rh, Ir, and Ni; or may be selected from Groups 4, 5, and 6 atoms; or may be selected from Ti, Zr, and Hf atoms; or may be Zr. The oxidation state of the metal atom "M" may range from 0 to +7; or may be +1, +2, +3, +4, or +5; or may be +2, +3, or +4. The groups bound to the metal atom "M" are such that the compounds described below in the formulas and structures are electrically neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

Useful metallocene catalyst components may include those represented by the formula (I):

wherein M is as described above; each X is chemically bonded to M; each Cp group is chemically bonded to M; and n is 0 or an integer from 1 to 4, or is 1 or 2.

The ligands represented by Cp$^A$ and Cp$^B$ in formula (I) may be the same or different cyclopentadienyl ligands or ligands isolobal to cyclopentadienyl, either or both of which may contain heteroatoms and either or both of which may be substituted by a group R. For example, Cp$^A$ and Cp$^B$ may be independently selected from cyclopentadienyl, indenyl, tetrahydroindenyl, fluorenyl, and substituted derivatives of each.

Independently, each Cp$^A$ and Cp$^B$ of formula (I) may be unsubstituted or substituted with any one or combination of substituent groups R. Non-limiting examples of substituent groups R include groups selected from hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. More particular non-limiting examples of alkyl substituents R include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals, including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituents R include, but are not limited to, olefins such as olefinically unsaturated substituents including vinyl-terminated ligands such as, for example, 3-butenyl, 2-propenyl, 5-hexenyl and the like. In some embodiments, at least two R groups (two adjacent R groups in a particular exemplary embodiment) are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X may be any leaving group or may be independently selected from: halogen ions, hydrides, C$_1$ to C$_{12}$ alkyls, C$_2$ to C$_{12}$ alkenyls, C$_6$ to C$_{12}$ aryls, C$_7$ to C$_{20}$ alkylaryls, C$_1$ to C$_{12}$ alkoxys, C$_6$ to C$_{16}$ aryloxys, C$_7$ to C$_{18}$ alkylaryloxys, C$_1$ to C$_{12}$ fluoroalkyls, C$_6$ to C$_{12}$ fluoroaryls, and C$_1$ to C$_{12}$ heteroatom-containing hydrocarbons and substituted derivatives; or may be selected from hydride, halogen ions, C$_1$ to C$_6$ alkyls, C$_2$ to C$_6$ alkenyls, C$_7$ to C$_{18}$ alkylaryls, C$_1$ to C$_6$ alkoxys, C$_6$ to C$_{14}$ aryloxys, C$_7$ to C$_{16}$ alkylaryloxys, C$_1$ to C$_6$ alkylcarboxylates, C$_1$ to C$_6$ fluorinated alkylcarboxylates, C$_6$ to C$_{12}$ arylcarboxylates, C$_7$ to C$_{18}$ alkylarylcarboxylates, C$_1$ to C$_6$ fluoroalkyls, C$_2$ to C$_6$ fluoroalkenyls, and C$_7$ to C$_{18}$ fluoroalkylaryls; or may be selected from hydride, chloride, fluoride, methyl, phenyl, phenoxy, benzoxy, tosyl, fluoromethyls and fluorophenyls; or may be selected from C$_1$ to C$_{12}$ alkyls, C$_2$ to C$_{12}$ alkenyls, C$_6$ to C$_{12}$ aryls, C$_7$ to C$_{20}$ alkylaryls, substituted C$_1$ to C$_{12}$ alkyls, substituted C$_6$ to C$_{12}$ aryls, substituted C$_7$ to C$_{20}$ alkylaryls and C$_1$ to C$_{12}$ heteroatom-containing alkyls, C$_1$ to C$_{12}$ heteroatom-containing aryls and C$_1$ to C$_{12}$ heteroatom-containing alkylaryls; or may be selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls; or may be selected from fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls); or may be fluoride in some embodiments.

Other non-limiting examples of X groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides, halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In some embodiments, two or more X's may form a part of a fused ring or ring system.

Other useful metallocene catalyst components may include those of formula (I) where $Cp^A$ and $Cp^B$ are bridged to each other by at least one bridging group, (A), such that the structure is represented by formula (II):

$$Cp^A(A)Cp^B MX_n \qquad (II)$$

These bridged compounds represented by formula (II) are known as "bridged metallocenes". The elements $Cp^A$, $Cp^B$, M, X and n in structure (II) are as defined above for formula (I); wherein each Cp ligand is chemically bonded to M, and (A) is chemically bonded to each Cp. Non-limiting examples of bridging group (A) include divalent hydrocarbon groups containing at least one Group 13 to 16 atom, such as at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, R'$_2$C=, R'$_2$Si=, =Si(R')$_2$Si(R'$_2$)=, R'$_2$Ge=, and R'P= (wherein "=" represents two chemical bonds), where R' is independently selected from hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In some embodiments, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; as well as dimethylsilyl, diethylsilyl, dimethylgermyl and diethylgermyl.

In some embodiments, bridging group (A) may also be cyclic, having, for example, 4 to 10 ring members, or 5 to 7 ring members. The ring members may be selected from the elements mentioned above, and, in some embodiments, are selected from one or more of B, C, Si, Ge, N and O. Non-limiting examples of ring structures which may be present as, or as part of, the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In some embodiments, one or two carbon atoms are replaced by at least one of Si and Ge. The bonding arrangement between the ring and the Cp groups may be either cis-, trans-, or a combination.

The cyclic bridging groups (A) may be saturated or unsaturated and/or may carry one or more substituents and/or may be fused to one or more other ring structures. If present, the one or more substituents may be selected from hydrocarbyl (e.g., alkyl, such as methyl) and halogen (e.g., F, Cl). The one or more Cp groups to which the above cyclic bridging moieties may optionally be fused may be saturated or unsaturated, and may be selected from those having 4 to 10, or more particularly 5, 6, or 7 ring members (selected from C, N, O and S in some embodiments), such as, for example, cyclopentyl, cyclohexyl, and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formulae (I) and (II) may be different from each other, or may be the same.

Useful metallocene catalyst components may also include bridged mono-ligand metallocene compounds (e.g., mono cyclopentadienyl catalyst components). In these embodiments, the at least one metallocene catalyst component is a bridged "half-sandwich" metallocene represented by the formula (III):

$$Cp^A(A)QMX_r \qquad (III)$$

wherein $Cp^A$ is defined above and is bound to M; (A) is a bridging group bonded to Q and $Cp^A$; and an atom from the Q group is bonded to M; and r is an integer 0, 1 or 2.

In formula (III) above, $Cp^A$, (A) and Q may form a fused ring system. The X groups of formula (III) are as defined above in formula (I) and (II). In one exemplary embodiment, $Cp^A$ is selected from cyclopentadienyl, indenyl, tetrahydroindenyl, fluorenyl, substituted versions thereof, and combinations thereof.

In formula (III), Q is a heteroatom-containing ligand in which the bonding atom (the atom that is bonded with the metal M) may be selected from Group 15 atoms and Group 16 atoms. For example, the bonding atom may be selected from nitrogen, phosphorus, oxygen or sulfur atoms, or may be selected from nitrogen and oxygen. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds having Group 15 and Group 16 atoms capable of bonding with M.

Useful metallocene catalyst components may include unbridged "half sandwich" metallocenes represented by the formula (IVa):

$$Cp^A MQ_q X_w \qquad (IVa)$$

wherein $Cp^A$ is defined as for the Cp groups in (I) and is a ligand that is bonded to M; each Q is independently bonded to M; X is a leaving group as described above in (I); w ranges from 0 to 3, and is 0 or 3; q ranges from 0 to 3, or is 0 or 3.

In formula (IVa) $Cp^A$ may be selected from cyclopentadienyl, indenyl, tetrahydroindenyl, fluorenyl, substituted versions thereof, and combinations thereof. In formula (IVa), Q may be selected from ROO⁻, RO—, R(O)—, —NR—, —CR$_2$—, —S—, —NR$_2$, —CR$_3$, —SR, —SiR$_3$, —PR$_2$, —H, and substituted and unsubstituted aryl groups, R may be selected from $C_1$ to $C_6$ alkyls, $C_6$ to $C_{12}$ aryls, $C_1$ to $C_6$alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (IVb), such as described in, for example, U.S. Pat. No. 6,069,213:

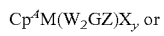

 (IVb)

wherein M, $Cp^A$, and X are as defined above; $W_2GZ$ forms a polydentate ligand unit (e.g., pivalate), wherein at least one of the W groups form a bond with M, and is defined such that each W is independently selected from —O—, —NR—, —CR$_2$— and —S—; G is either carbon or silicon; and Z is selected from R, —OR, —NR$_2$, —CR$_3$, —SR, —SiR$_3$, —PR$_2$, and hydride, providing that when W is —NR—, then Z is selected from —OR, —NR$_2$, —SR, —SiR$_3$, —PR$_2$; and provided that neutral valency for W is satisfied by Z; and wherein each R is independently selected from $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys; y is 1 or 2; T is a bridging group selected from $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^AM(W_2GZ)X_y$" groups, and is chemically bonded to the $Cp^A$ groups; and m is an integer from 1 to 7, or is an integer from 2 to 6.

The metallocene catalyst may be selected from bis(n-propylcyclopentadienyl)hafnium $X_n$, bis(n-butylcyclopentadienyl)hafnium $X_n$, bis(n-pentylcyclopentadienyl)hafnium $X_n$, (n-propyl cyclopentadienyl)(n-butylcyclopentadienyl) hafnium $X_n$, bis[(2-trimethylsilylethyl)cyclopentadienyl] hafnium $X_n$, bis(trimethylsilyl cyclopentadienyl)hafnium $X_n$, dimethylsilylbis(n-propylcyclopentadienyl)hafnium $X_n$, dimethylsilylbis(n-butylcyclopentadienyl)hafnium $X_n$, bis(1-n-propyl-2-methylcyclopentadienyl)hafnium $X_n$, (n-propylcyclopentadienyl)(1-n-propyl-3-n-butylcyclopentadienyl)hafnium $X_n$, or combinations thereof, where $X_n$ is as described above.

In other embodiments, the metallocene catalyst may be a bis(n-propylcyclopentadienyl)hafnium dichloride, a bis(n-propylcyclopentadienyl)hafnium difluoride, or a bis(n-propylcyclopentadienyl)hafnium dimethyl.

It is contemplated that the metallocene catalysts components described above include their structural or optical or enantiomeric isomers (racemic mixture), and, in some embodiments, may be a pure enantiomer.

The catalysts may be used with cocatalysts and promoters (e.g., alkylaluminums, alkylaluminum halides, alkylaluminum hydrides, and aluminoxanes). The activator may be, for example, methylaluminoxane.

In some instances, the one or more catalysts may be combined with up to about 10 wt % of one or more antistatic agents as are known in the art, such as a metal-fatty acid compound (e.g., an aluminum stearate), based upon the weight of the catalyst system (or its components). Other metals that may be suitable include other Group 2 and Group 5-13 metals. One or more antistatic agents may be added directly to the reactor system as well.

Supports may be present as part of the catalyst system. In some embodiments, the support material may be a porous support material. Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, and polymers such as polyvinylchloride and substituted polystyrene, functionalized or crosslinked organic supports such as polystyrene divinyl benzene polyolefins or polymeric compounds, and mixtures thereof, and graphite, in any of its various forms.

In some instances, supported catalyst(s) may be combined with activators by tumbling and/or other suitable means, optionally with up to about 2.5 wt % (by weight of the catalyst composition) of an antistatic agent. Exemplary antistatic agents may include, but are not limited to, an ethoxylated or methoxylated amine (e.g., KEMAMINE AS-990, available from ICI Specialties) and polysulfone copolymers in the OCTASTAT family of compounds, more specifically Octastat 2000, 3000, and 5000 (available from Octel).

In some embodiments, the antistatic agent may be mixed with the catalyst and fed into the reactor. In other embodiments, the antistatic agent may be fed into the reactor separate from the catalyst. One advantage of this method of addition is that it permits on-line adjustment of the level of the additive. The antistatic agents may individually be in a solution, slurry, or as a solid (preferably as a powder) before introduction into the reactor.

In various embodiments, a polymerization reaction according to the methods described herein may optionally employ other additives, such as inert particulate particles.

In some embodiments, the polymerization reaction may be performed at a reactor pressure of up to about 600 psi (4138 kPa), about 100 psi (690 kPa) to about 600 psi (4138 kPa), about 200 psi (1379 kPa) to about 400 psi (2759 kPa), or about 250 psi (1724 kPa) to about 350 psi (2414 kPa).

In some embodiments, the polymerization reaction temperature may be about 30° C. to about 120° C., about 60° C. to about 115° C., about 70° C. to about 110° C., or about 70° C. to about 105° C.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

A series of polyolefin production runs were performed using hydrogen, ethylene monomer, isopentane as the ICA, and a hafnium metallocene catalyst. The isopentane partial pressure was adjusted between 6 psi and 40 psi. Generally, as the isopentane partial pressure increased, the polyolefin productivity increased and the melt index decreased. Specifically, the polyolefin productivity increased by about 14% when comparing 6 psi isopentane partial pressure to 40 psi isopentane partial pressure.

In a second series of polyolefin production runs, similar to the first, the $H2_{mol}$:monomer$_{mol}$ was increased by increasing $H2_{PP}$ by an amount sufficient to maintain the melt index of the produced polyolefin. The polyolefin productivity increased by about 24% when comparing 6 psi isopentane partial pressure to 40 psi isopentane partial pressure where the melt index was maintained by increased $H2_{PP}$.

These examples demonstrate that when using a metallocene catalyst, the $H2_{mol}$:monomer$_{mol}$ may be increased to maintain the polyolefin melt index. Further, when $H2_{PP}$ is increased so as to increase the $H2_{mol}$:monomer$_{mol}$, the increased ICA concentration and increased $H2_{PP}$ synergistically increase the polyolefin production.

Figure 2:
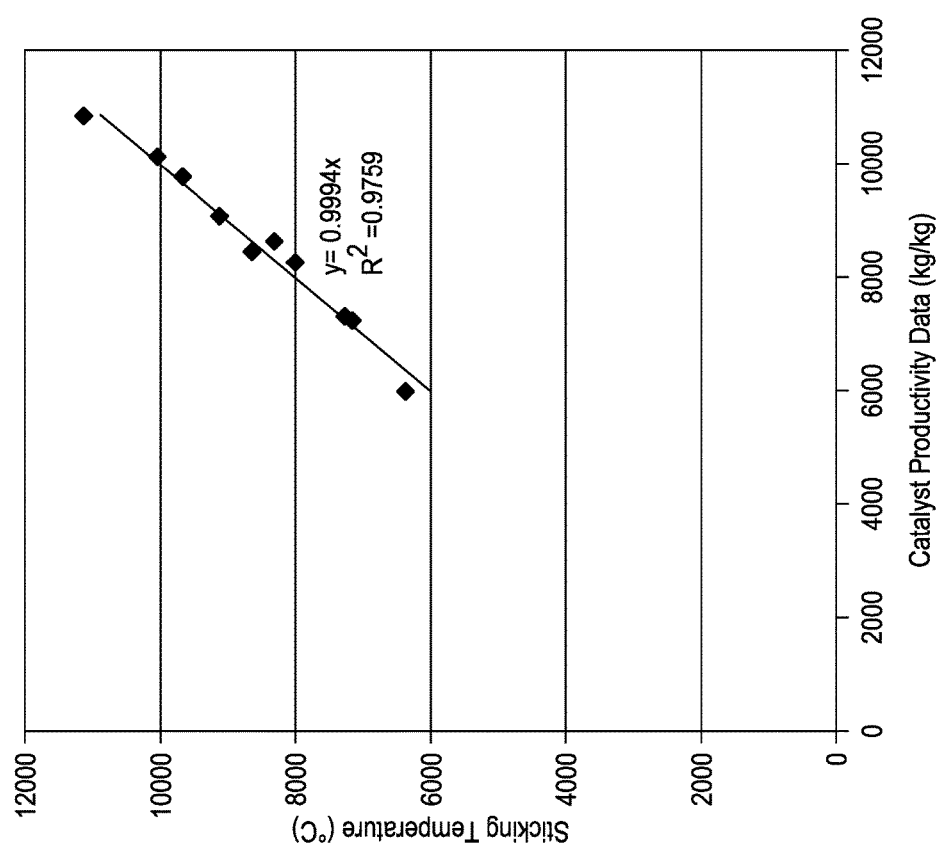
FIG. 2 provides a comparison of the modeled data to the laboratory data for a series of polyolefin production runs.

In another example, the data from the above examples was compared to a catalyst productivity regression (Equation 1). FIG. 2 provides a comparison of the modeled data to the laboratory data, which shows that the catalyst productivity regression is in good agreement with the laboratory data.

$$Prod = K*\left(\frac{H2}{C2}\right)^a *(IC5_{PP})^b *\theta/(1+\theta\{k_d+k_{ca300}*CA_{ppm}\}) \quad \text{Equation 1}$$

where: Prod is catalyst productivity, kg polyolefin/kg catalyst

H2/C2 is hydrogen to ethylene gas ration, ppm/mol %

$IC5_{PP}$ is isopentane partial pressure, psi $k_d$ is a catalyst deactivation coefficient, l/h (0.4 l/h)

$k_{ca300}$ is a deactivation due to UT-CA-300 (a white mineral oil additive that results in some deactivation of the catalyst), l/h/ppm UT-CA-300 (0.0053 l/h/ppm UT-CA-300)

$CA_{ppm}$ is the concentration of UT-CA-300 in the reactor, ppm $\theta$ is reactor residence time, hr K, a, and b are coefficients (4528 l/h, 0.234, and 0.070, respectively)

Figure 3:
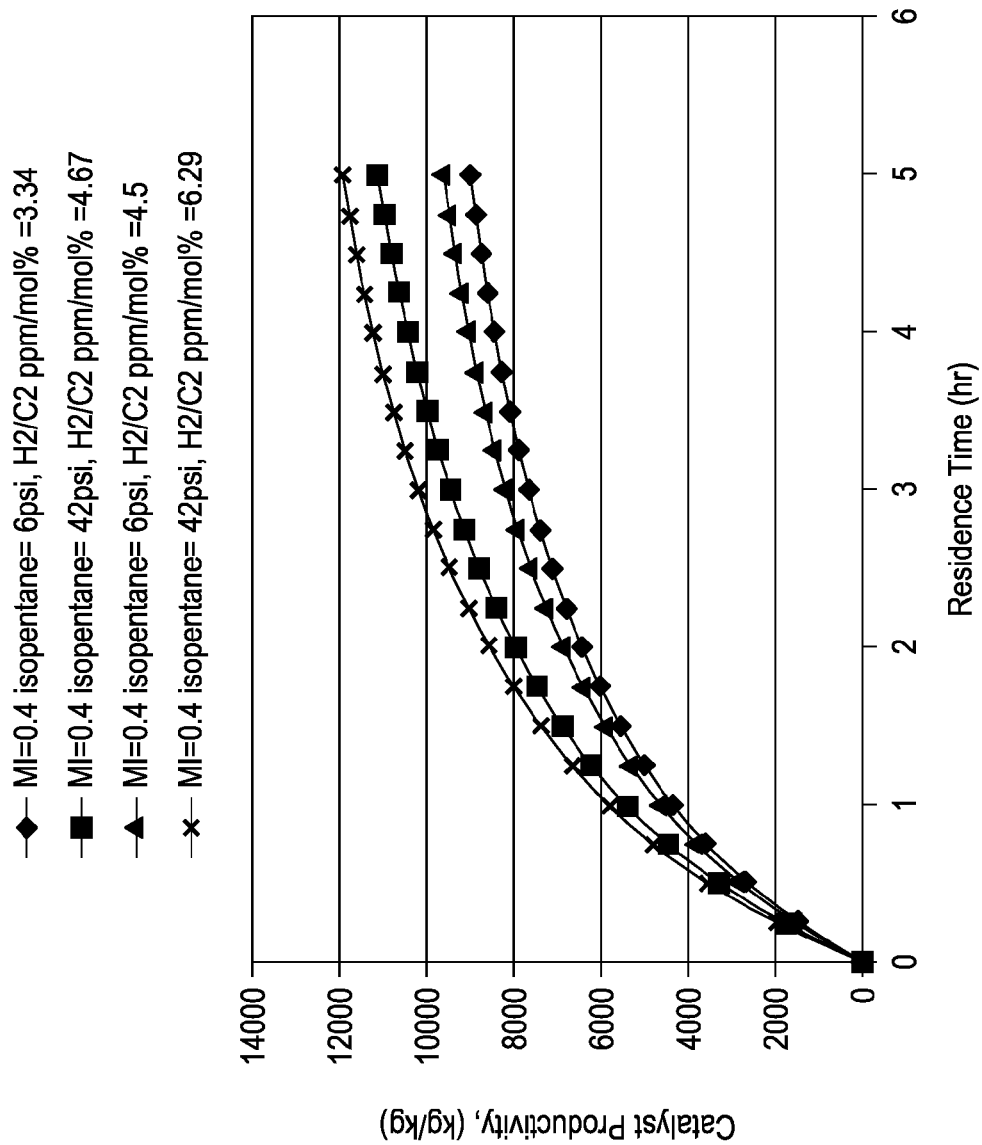
FIG. 3 is a plot of productivity as a function of residence time for four different reaction conditions.

Additionally, the relationship between productivity and residence time was investigated using the catalyst productivity regression and is illustrated in FIG. 3. The regression was used to calculate catalyst productivity as a function of residence time for four different reaction conditions, which are provided in FIG. 3. The results illustrate that increasing the isopentane partial pressure and the H2/C2, while maintaining melt index, increases the catalyst productivity.

Figure 4:
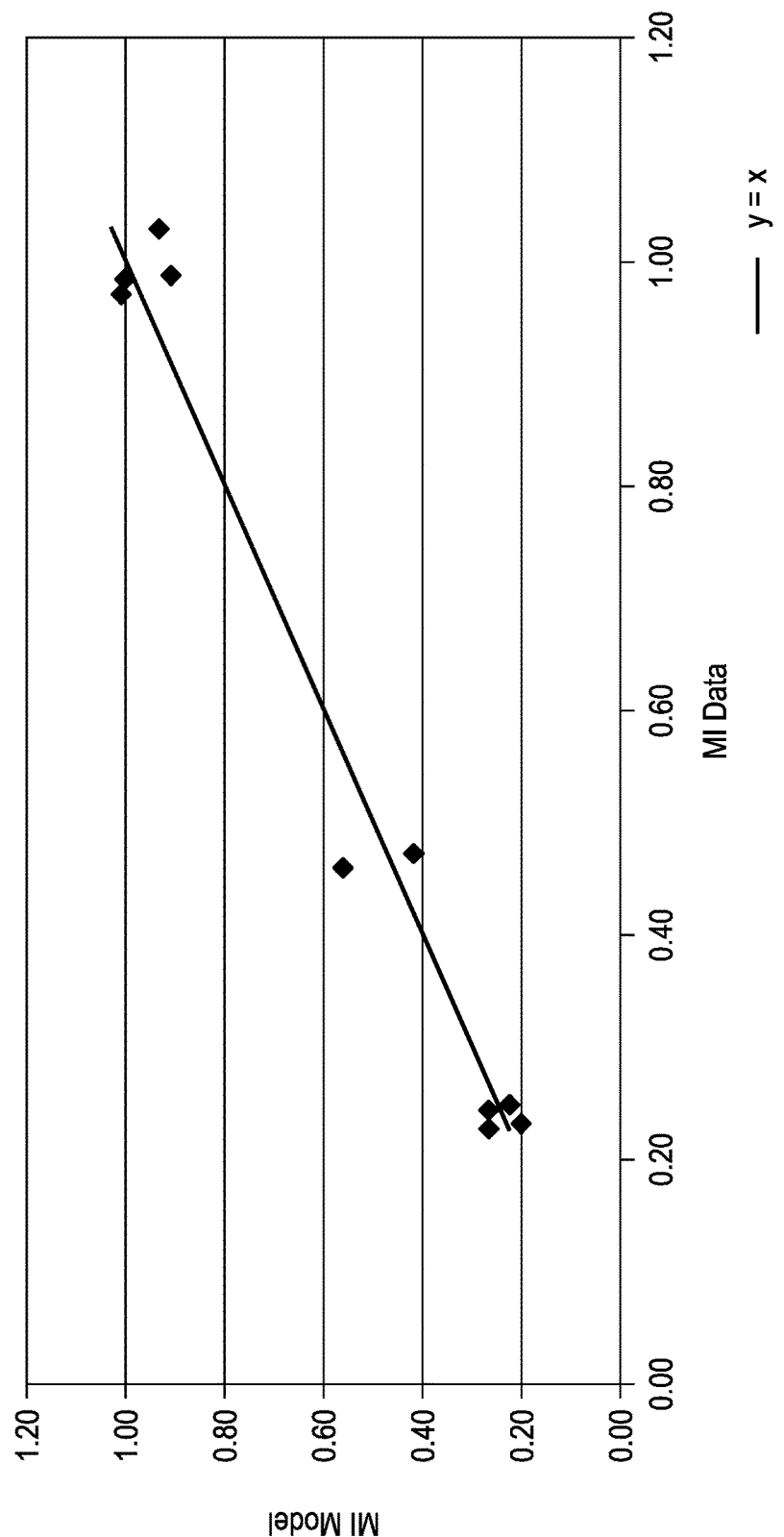
FIG. 4 is a plot of the melt index modeled versus melt index data with an overlay of y=x.
Figure 5:
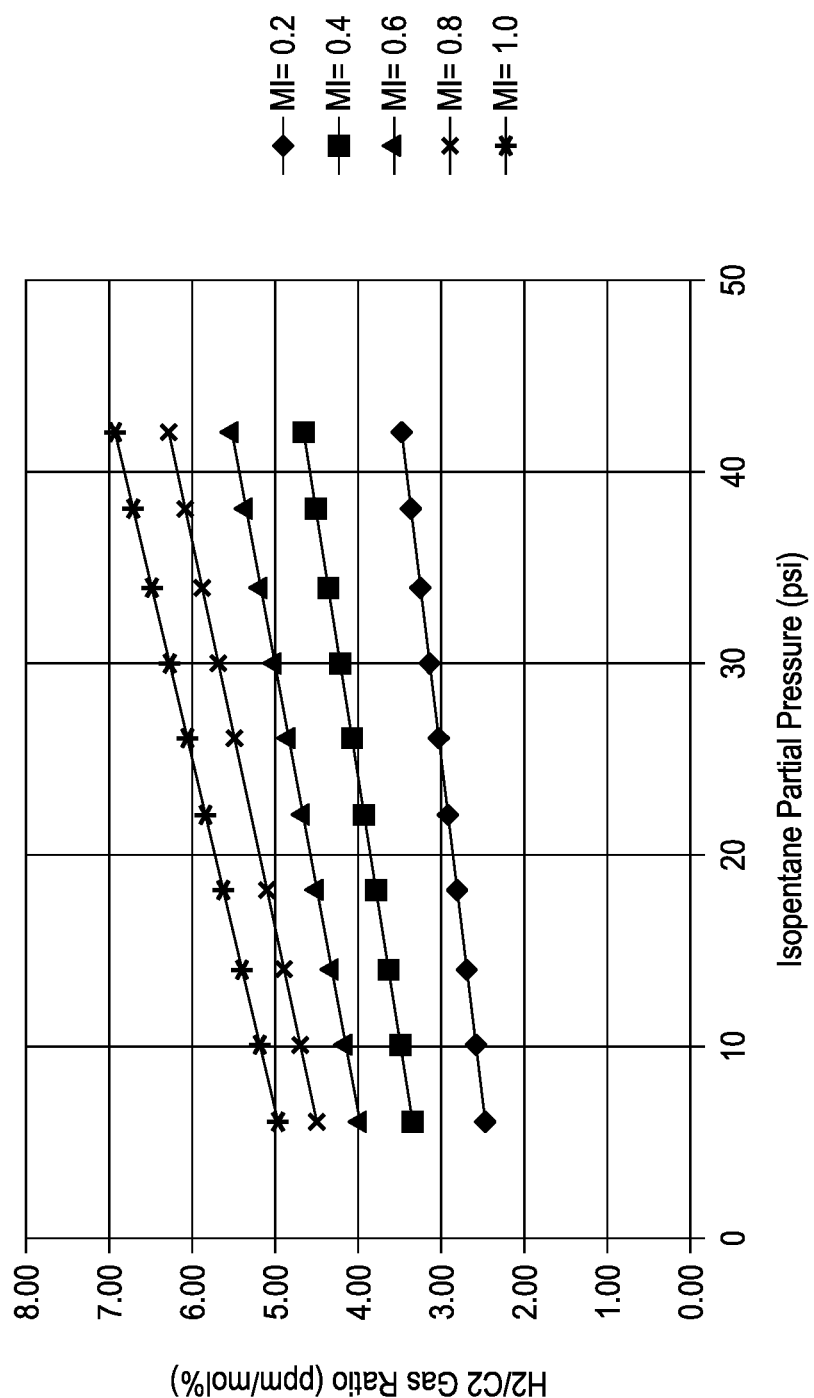
FIG. 5 is a plot of calculated results for the relationship between the H2/C2 (ppm/mol %) and isopentane partial pressure at various melt index values.

The melt index modeled versus melt index data was plotted with an overlay of y=x (FIG. 4). Statistical analysis of the modeled versus data yield a T-stat greater than 2 and an $r_2$ of 0.96, which indicates that the H2/C2 (ppm/mol %) and isopentane partial pressure terms are statistically significant and demonstrates that the melt index increases with increasing H2/C2 (ppm/mol %) and decreases with increasing isopentane partial pressure. Additionally, the isopentane partial pressure coefficient is negative, which indicates that to maintain a constant melt index the H2/C2 (ppm/mol %) should be increased during transitions when the isopentane concentration increases. FIG. 5 is a plot of calculated results for the relationship between the H2/C2 (ppm/mol %) and isopentane partial pressure at various melt index values.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:

contacting in a fluidized bed gas phase reactor an olefin monomer with a catalyst system in the presence of an induced condensing agent (ICA) to produce a first polyolefin having a first melt index, the catalyst system comprising a metallocene catalyst;

increasing a partial pressure of the ICA in the reactor to produce a second polyolefin having a second melt index;
wherein increasing the partial pressure of the ICA results in a higher catalyst productivity for producing the second polyolefin when compared to the catalyst productivity for producing the first polyolefin.

2. The method of claim 1, wherein the catalyst productivity for producing the second polyolefin is at least 10% higher than the catalyst productivity for producing the first polyolefin.

3. The method of claim 1, wherein the catalyst productivity for producing the second polyolefin is at least 15% higher than the catalyst productivity for producing the first polyolefin.

4. The method of claim 1, wherein the second melt index is within 10% of the first melt index.

5. The method of claim 1, wherein the second melt index is more than 10% different from the first melt index.

6. The method of claim 1, wherein the second melt index is within 1 dg/minute of the first melt index.

7. The method of claim 1, wherein the second melt index is more than 1 dg/minute different from the first melt index.

8. The method of claim 1, wherein at least one of a partial pressure of olefin monomer in the reactor, a partial pressure of hydrogen in the reactor, or a partial pressure comonomer in the reactor is altered the change the second melt index.

9. The method of claim 1, wherein a partial pressure of olefin monomer in the reactor is altered to bring or maintain the second melt index to within 10% of the first melt index.

10. The method of claim 1, wherein a partial pressure of olefin monomer in the reactor is increased to bring or maintain the second melt index to within 10% of the first melt index.

11. The method of claim 1, wherein a partial pressure of hydrogen in the reactor is altered to bring or maintain the second melt index to within 10% of the first melt index.

12. The method of claim 1, wherein a partial pressure of hydrogen in the reactor is increased to bring or maintain the second melt index to within 10% of the first melt index.

13. The method of claim 1, wherein a partial pressure of comonomer in the reactor is altered to bring or maintain the second melt index to within 10% of the first melt index.

14. The method of claim 1, wherein a partial pressure of comonomer in the reactor is decreased to bring or maintain the second melt index to within 10% of the first melt index.

15. The method of claim 1, wherein the catalyst system further comprises an activator and a support.

16. The method of claim 1, wherein the metallocene catalyst comprises a compound selected from the group consisting of:
bis(n-propylcyclopentadienyl)hafnium $X_n$, bis(n-butylcyclopentadienyl)hafnium $X_n$, bis(n-pentylcyclopentadienyl)hafnium $X_n$, (n-propyl cyclopentadienyl)(n-butylcyclopentadienyl)hafnium $X_n$, bis[(2-trimethylsilylethyl)cyclopentadienyl]hafnium $X_n$, bis (trimethylsilyl cyclopentadienyl)hafnium $X_n$, dimethylsilylbis(n-propylcyclopentadienyl)hafnium $X_n$, dimethylsilylbis(n-butylcyclopentadienyl)hafnium $X_n$, bis(1-n-propyl-2-methylcyclopentadienyl)hafnium $X_n$, (n-propylcyclopentadienyl)(1-n-propyl-3-n-butylcyclopentadienyl)hafnium $X_n$;
wherein $X_n$ is selected from the group consisting of halogen ions, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons and substituted derivatives thereof.

17. The method of claim 1, wherein the metallocene catalyst comprises a silica supported bis(n-propyl cyclopentadienyl) hafnium-based metallocene catalyst and methylalumoxane.

18. The method of claim 1, wherein the ICA comprises a compound selected from the group consisting of n-butane, isobutane, n-pentane, isopentane, hexane, isohexane, and any combination thereof.

19. The method of claim 1, wherein the olefin monomer is ethylene and the at least one comonomer is selected from the group consisting of propylene, 1-butene, 1-pentene, 1-hexene, 1-heptene, 1-octene, 4-methylpent-1-ene, 1-decene, 1-dodecene, 1-hexadecene, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, isoprene, styrene, butadiene, isobutylene, chloroprene, acrylonitrile, and a cyclic olefin.

* * * * *